July 16, 1963 J. H. SMITH 3,097,505
AIR CONDITIONER FOR INDUSTRIAL CONTROL QUARTERS
Filed Feb. 10, 1961 4 Sheets-Sheet 1

INVENTOR.
John H. Smith
BY
Frease, Bishop, Johns & Schick
ATTORNEYS

July 16, 1963 J. H. SMITH 3,097,505
AIR CONDITIONER FOR INDUSTRIAL CONTROL QUARTERS
Filed Feb. 10, 1961 4 Sheets-Sheet 2

INVENTOR.
John H. Smith
BY
Frease, Bishop, Johns & Schick
ATTORNEYS

July 16, 1963  J. H. SMITH  3,097,505
AIR CONDITIONER FOR INDUSTRIAL CONTROL QUARTERS
Filed Feb. 10, 1961  4 Sheets-Sheet 3

INVENTOR.
John H. Smith
BY
Frease, Bishop, Johns & Schick
ATTORNEYS

July 16, 1963 J. H. SMITH 3,097,505
AIR CONDITIONER FOR INDUSTRIAL CONTROL QUARTERS
Filed Feb. 10, 1961 4 Sheets-Sheet 4

INVENTOR.
John H. Smith
BY
Frease, Bishop, Johns & Schick
ATTORNEYS

United States Patent Office 3,097,505
Patented July 16, 1963

3,097,505
AIR CONDITIONER FOR INDUSTRIAL
CONTROL QUARTERS
John H. Smith, Willoughby, Ohio, assignor to Correct-Air Corporation, Willoughby, Ohio, a corporation of Ohio
Filed Feb. 10, 1961, Ser. No. 88,476
6 Claims. (Cl. 62—261)

The invention relates to air conditioners and more particularly to heavy-duty air conditioners for use in crowded control quarters, such as the cab of an overhead crane, a pulpit for control of machinery and equipment, and the like.

It is usually desirable to provide an air conditioner in control quarters such as the cab of an overhead crane, a control pulpit, and the like, for selectively cooling and heating, dehumidifying and/or removing dust, fumes and the like.

It frequently happens that such control quarters are quite small and crowded or cramped for space, making it very difficult to locate suitable air conditioning apparatus therein without unduly crowding the same and interfering with the proper functioning of the operator.

Such industrial control quarters as the cab of an overhead crane, the pulpit for control of machinery, rolling mill apparatus, or other equipment and the like, are ordinarily provided with a seat for the operator.

The present invention contemplates the provision of an industrial air conditioner for such purpose, in which the operator's seat is mounted upon the air conditioner unit, whereby the air conditioner provides the support for the seat, replacing the conventional base or supporting means, and is thus located beneath the seat in a space which would otherwise be wasted.

Another object of the invention is to provide such an air conditioner in which the operator's seat is adjustably mounted upon the top of the case or housing enclosing the air conditioner apparatus, whereby the operator may adjust the seat, relative to the air conditioner, to required or desired position.

A further object of the invention is to provide such a device in which the air conditioner unit forms the sole support or base for the operator's seat, so that no additional space is required to accommodate the air conditioner or the supporting means for the seat.

A still further object of the invention is to provide a device of the character referred to in which the operator's seat is mounted upon a hinged cover plate forming the top of the housing for the air conditioner apparatus.

Another object of the invention is to provide a device of this character in which an air inlet duct extends upwardly from the intake side of the air conditioner for returning warm air from adjacent the ceiling of a cab or other control quarters.

A further object of the invention is to provide such a device in which conditioned air is discharged at floor level, at each side of the operator seated upon the operator's seat, and will continually pass upward around the operator's body.

The above objects together with others which will be apparent from the drawings and following description, or which may be later referred to, may be attained by constructing the improved air conditioner unit in the manner hereinafter described in detail and illustrated in the accompanying drawings.

In general terms, the invention may be briefly described as comprising a heavy-duty air conditioner unit, enclosed within a case or housing, for use in crowded or cramped control quarters, such as the cab of an overhead crane, a pulpit for control of machinery, rolling mill apparatus, or other equipment, and the like, in which the control quarters are small and cramped for space.

The air conditioner unit is located in the control quarters, directly beneath the usual operator's seat therein, and forms the support or base for the seat. The operator's seat is mounted upon the top of the housing enclosing the air conditioner apparatus, whereby no additional support or base is required for the seat, and the air conditioner apparatus is located in the space beneath the seat which would otherwise be wasted.

The top of the air conditioner housing comprises a hingedly connected cover plate, upon which the seat is mounted, and which provides for top access to the air conditioning apparatus therein.

The operator's seat is adjustably mounted upon the top of the housing or case enclosing the air conditioner apparatus and provided with suitable control means so that the operator may adjust the position of the seat as may be desired.

Having thus briefly described the invention, reference is now made to the accompanying drawings illustrating a preferred embodiment of the invention in which.

Figure 1:
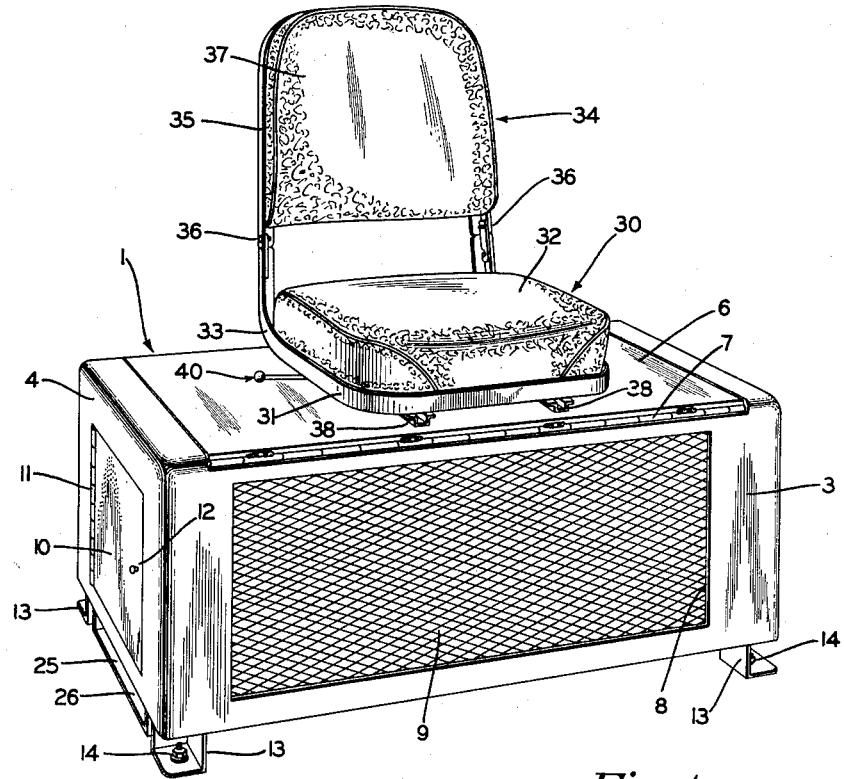
FIG. 1 is a perspective view of the heavy-duty industrial air conditioner unit with operator's seat adjustably mounted upon the top thereof, for installation in crowded or cramped control quarters.
Figure 2:
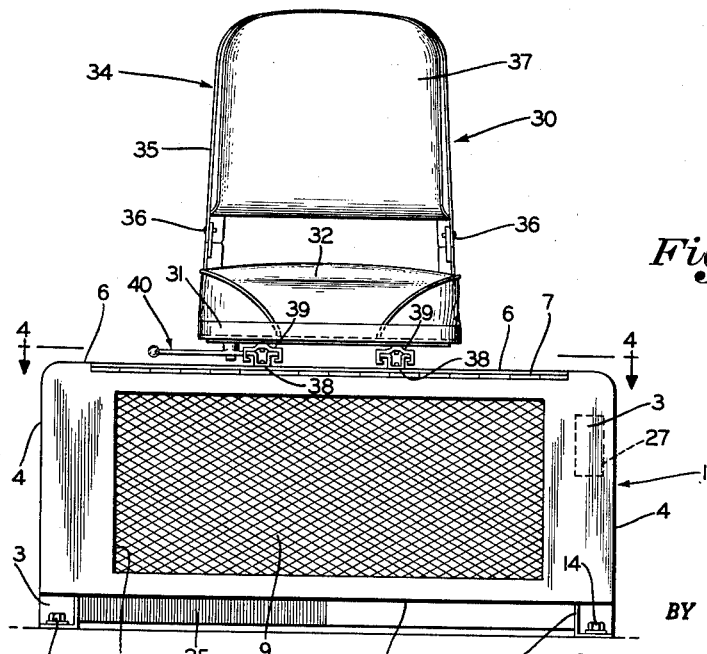
FIG. 2 is a front elevation of the air conditioner unit with the operator's seat mounted thereon.

Referring first more particularly to the embodiment of the invention illustrated in FIGS. 1 to 4, in which similar numerals refer to similar parts throughout, the air conditioner unit is mounted within a housing, indicated generally at 1, comprising the back wall 2, front wall 3, side walls 4, bottom wall 5 and top plate 6 hingedly connected at its forward edge to the upper edge of the front wall 3, as indicated at 7.

The front wall 3 is shown in this embodiment of the invention as having an opening 8 extending over the greater portion of its area, a grill 9, of expanded metal or the like, covering said opening.

A side access door 10 may be located in one of the side walls 4, being hingedly connected at one vertical edge, as indicated at 11, and having at its swinging end a knob or handle 12 for operating any usual and well known form of latch (not shown) for holding the door in closed position and providing means for manually opening and closing the door.

Angular feet 13 are provided at the lower corners of the housing for supporting the same slightly spaced above the floor. By means of bolts 14, located through the feet 13, the air conditioner unit may be anchored securely to the floor of any industrial control quarters such as the cab of an overhead crane, a control pulpit for rolling mill apparatus, machinery or other equipment and the like, where, because of high temperatures in which the operator must work, it is necessary that means be provided for air conditioning the same.

Figure 3:
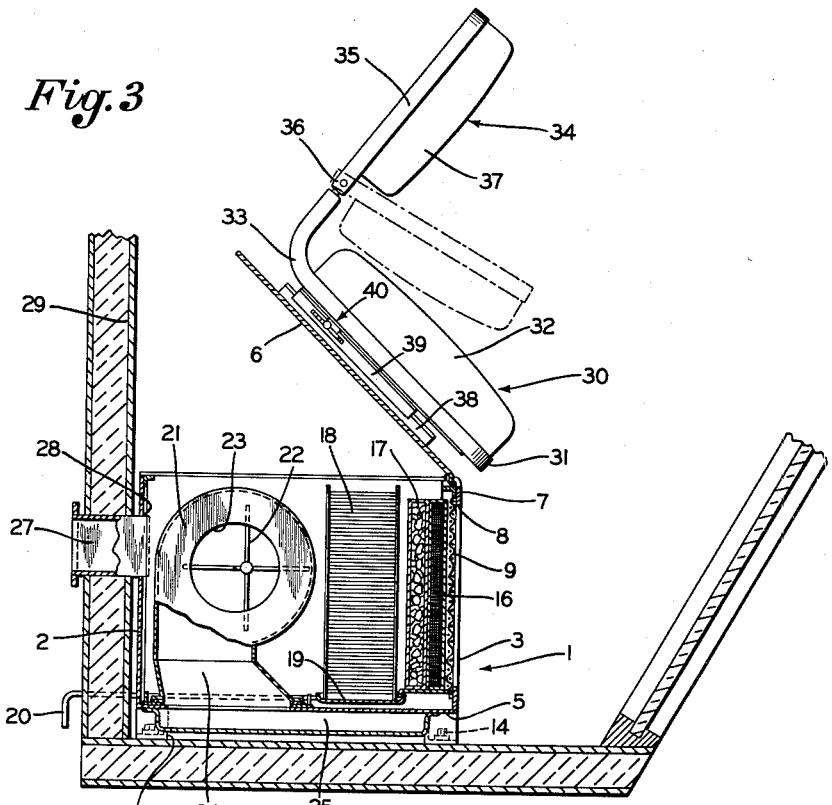
FIG. 3 is a side elevation of the air conditioner unit and operator's seat, the housing of the air conditioner being broken away to show the air conditioning apparatus therein.
Figure 4:
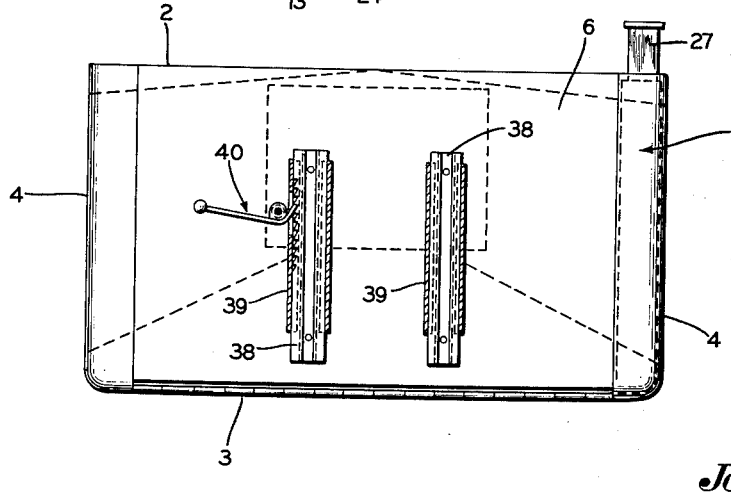
FIG. 4 is a plan sectional view showing the seat-adjusting mechanism.

Suitable heavy-duty air conditioning apparatus is located within the housing 1, and air filter means is located in the front side of the housing, adjacent to the opening 8. As shown in FIG. 3, the filter means may comprise a mechanical filter 16 such as are commonly used in heating furnaces of the blower type, and a charcoal filter 17, both of which are removable and replaceable through the open top of the housing when the hinged cover or top plate 6 is opened.

It should be understood that this hinged cover plate is so mounted that it may be opened 120° in order to have complete access to the interior of the housing through the open top thereof.

An evaporator coil 18 is located within the housing, to the rear of the filters, and may be connected in usual and well-known manner to a suitable compressor (not shown). A drip pan 19 is located within the housing, beneath the evaporator coil, and a drain pipe 20 is connected thereto and leads to a point outside of the cab, control pulpit, or other control quarters within which the air conditioner is located.

A blower is located within the housing 1, which may comprise a snail-type blower housing 21, having a rotary fan 22 therein. The blower housing has the intake eye 23 in one side and the discharge neck 24 extends downwardly therefrom and communicates with the cooling duct 25, located below the bottom wall 5 of the housing and having discharge openings 26 beneath each side wall 4 of the housing.

For the purpose of admitting fresh air to the air conditioner unit, a fresh air make-up duct 27 may be telescopically located through the fresh air opening 28 in the back wall 2 of the housing and extended through the back wall 29 of the cab, pulpit, or other control quarters within which the air conditioner unit is located.

In the operation of the air conditioner, air from within the cab, pulpit, or other control quarters, is drawn into the housing 1 through the opening 8 in the front wall thereof, passing through the filters 16 and 17 which remove dust, dirt and objectionable fumes from the air and de-humidifying the air.

The filtered air is then cooled as it passes around the evaporator coil 18, and enters the intake eye 23 of the blower housing, the cooled air being discharged from the blower through the discharge neck 24 into the cooling duct 25 and discharged through the open ends 26 thereof into the interior of the cab, pulpit, or other control quarters.

At the same time, a small amount of fresh air from outside of the control quarters is drawn in through the fresh air make-up duct 27 and passed through the filters to the blower and discharged from the cooling duct 26 into the interior of the cab or the like.

Owing to the fact that such crane cabs, control pulpits, and the like, are quite small and crowded or cramped for space, the air conditioner unit is so located therein that it provides the support for the usual operator's seat, indicated generally at 30. Thus, the usual base or support for the operator's seat is dispensed with and the air conditioner unit occupies space beneath the operator's seat which would otherwise be wasted.

It should be understood that, for this purpose, the housing 1 of the air conditioner unit is of sufficiently heavy construction that it will support the weight of the operator seated on the seat 30.

The operator's seat may be of any usual and suitable construction and comprises generally the steel frame 31 having a seat cushion 32 mounted thereon. The frame 31, as shown in the drawings, is of substantially U shape, the rear ends of the legs of the U being bent upwardly as at 33.

A back rest 34 is provided for the operator's seat and may comprise the inverted, U-shape metal frame 35, the ends of the legs of the U being pivoted as at 36 to the upturned ends 33 of the legs of the seat frame 31, so that, if desired, the back rest may be swung forwardly upon the pivots 36 so as to fold down upon the top of the seat cushion. A back cushion 37 is connected to the frame 35 of the back rest.

For the purpose of mounting the operator's seat for adjustment forwardly or backwardly upon the top of the air conditioner unit, a spaced pair of guide rails 38 are fixed upon the hinged top plate or cover 6 of the air conditioner housing and extend from the front edge of the top plate to a point adjacent to the rear edge thereof.

Correspondingly shaped runners or bars 39 are attached to the underside of the seat frame and slidably movable in the guide tracks 38. Thus, the opeartor's seat may be moved forwardly or rearwardly relative to the air conditioner housing 1, in the manner common in the front seats of automobiles.

Any suitable means, such as is generally used in automobile front seat constructions, for holding the seat in adjusted position, may be provided. Such means, as indicated generally by the handle 40 may be provided for controlling any usual and well known locking means for holding the seat in adjusted position.

Figure 5:
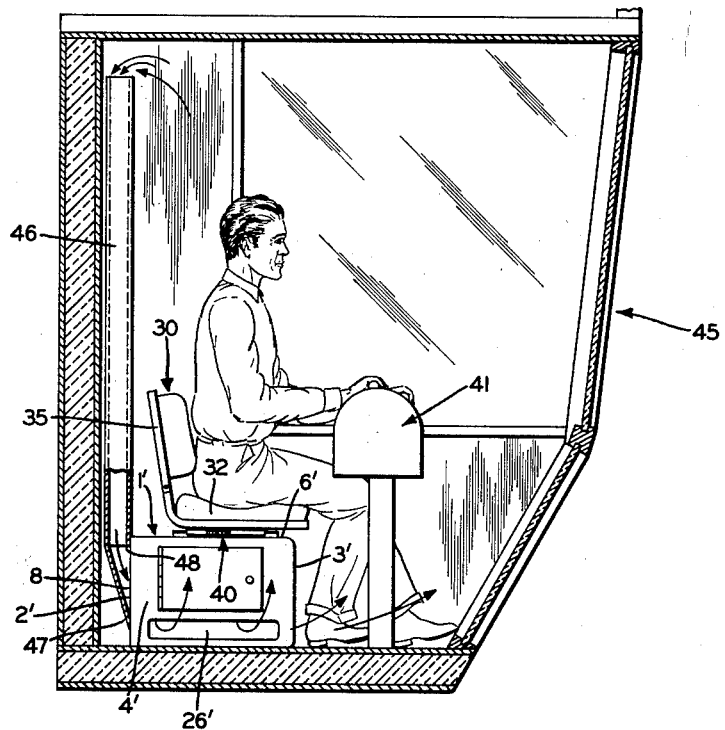
FIG. 5 is a vertical sectional view through the cab of an overhead crane, showing the air conditioner unit located therein with the operator's seat mounted thereon.

With this construction, it will be seen that the operator may adjust the seat to desired position so that he can sit thereon, as shown in FIG. 5, for operating controls as indicated generally at 41, and that, regardless of the temperature surrounding the control quarters, the interior of the control quarters may be maintained at a comfortable temperature within which he can perform his work.

The air conditioner unit, operating as above described, will continuously discharge cool air into the lower portion of the cab or other control quarters, the cooled air passing upward on each side of the operator and being returned to the air conditioner unit for re-cooling.

Figure 6:
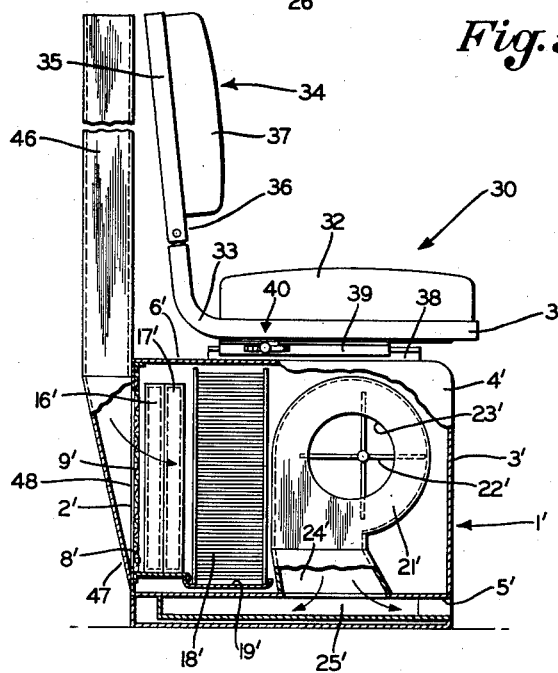
FIG. 6 is a transverse, vertical sectional view through a modified form of the invention, showing a ceiling return duct for directing warm air from the upper portion of a cab or other control quarters to the intake of the air conditioner.
Figure 7:
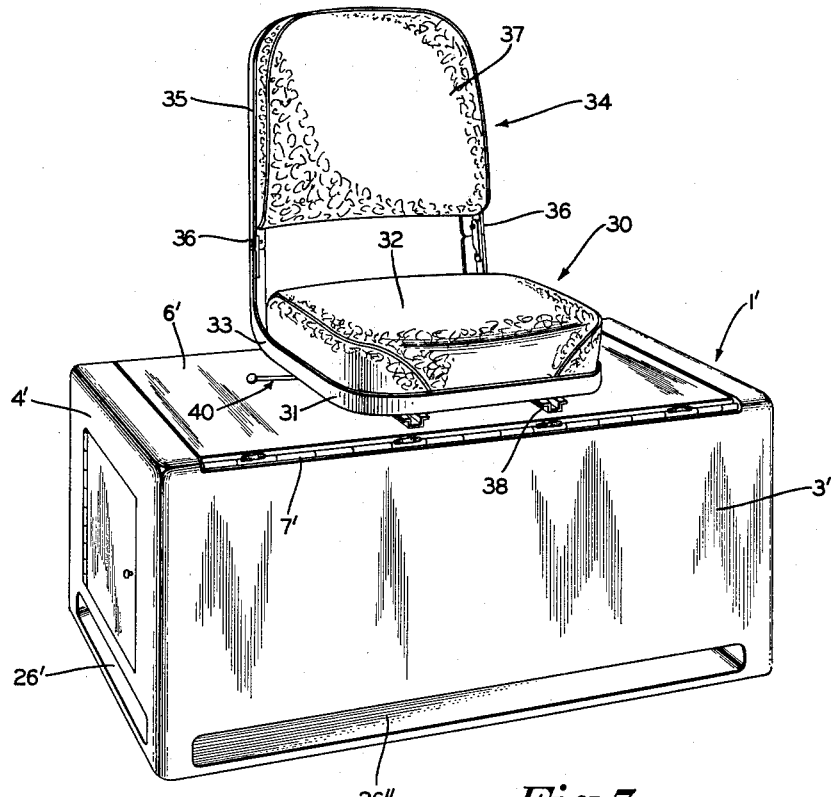
FIG. 7 is a perspective view of the modified form of the invention.

In FIGS. 5, 6 and 7 is shown a modified form of the air conditioner unit, in which air from the interior of the cab, or other control quarters, is taken into the rear end of the air conditioner unit, and the cooled air is discharged from the lower portion of the housing, at each side and at the front thereof.

In this form of the invention, the air conditioner housing is indicated generally at 1' and comprises the back wall 2', front wall 3', side walls 4', bottom wall 5' and top plate or cover 6', hingedly connected at its front edge to the upper edge of the front wall 3', as indicated at 7'.

The back wall 2' is shown in this embodiment of the invention as having an opening 8' extending over the greater portion of its area, a grill 9' of expanded metal, or the like, covering said opening.

If desired, a side access door, such as shown at 10 in the embodiment of the invention illustrated in FIGS. 1–4, may be provided in one of the side walls 4'.

Instead of being supported upon feet, as shown in the embodiment of FIGS. 1–4, the front, back and side walls of the housing 1' extend downwardly to the floor of the cab, or other control quarters, so that the bottom wall 5' of the housing will rest directly upon the floor. Any suitable means (not shown) may be provided for anchoring the housing 1' to the floor, if desired.

Suitable air filter means, such as a mechanical filter 16' and a charcoal filter 17', are located in the rear portion of the housing 1', adjacent to the opening 8'. These filters may be removed and replaced through the open top of the housing 1' when the hinged cover or top plate 6' is opened.

An evaporator coil 18' is located within the housing 1', in front of the filters, and may be connected in usual and well known manner to a suitable compressor (not shown). A drip pan 19' may be mounted within the housing, beneath the evaporator coil, and connected to a drain pipe (not shown) in the manner described with reference to the embodiment of the invention illustrated in FIGS. 1–4.

A blower is located within the housing and is shown as comprising the blower housing 21' with rotary fan 22' therein. The housing has an intake eye 23' on one side and the discharge neck 24' thereof communicates with the cooling duct 25' located directly above the bottom wall 5' and extending over substantially the entire area thereof and communicating with the discharge slots 26' and 26" in the lower portions of the side walls 4' and front wall 3' respectively of the housing.

The air conditioner will operate in much the same manner as described with reference to FIGS. 1–4. Air from within the cab, indicated generally at 45, is drawn into the housing 1' through the opening 8' in the back wall 2' thereof, and passes through the filters 16' and 17'.

The filtered air is then cooled by passing around the evaporator coil 18' and is drawn into the blower fan housing 21' through the inlet opening 23' thereof and discharged through the discharge neck 24' and cooling duct 25' and out of the discharge openings 26' and 26" in the lower portions of the side walls and front wall respectively of the housing.

The cooled air will pass upward around the sides and front of the operator seated upon the operator's seat on top of the air conditioner housing 1', keeping the interior of the cab, or other control quarters, at proper temperature so that the operator may comfortably work therein.

As an optional feature, a ceiling return may be provided for returning warmer air from the top of the cab, or other control quarters 45, to the air conditioner unit, as shown in FIG. 5. For this purpose, a duct 46 may be located adjacent to the rear wall of the control quarters 45 and provided with an open upper end positioned adjacent to the ceiling of the cab, or other control quarters. The lower end of the return duct 46 communicates with the intake opening in the back wall of the air conditioner housing 1'.

Figure 8:
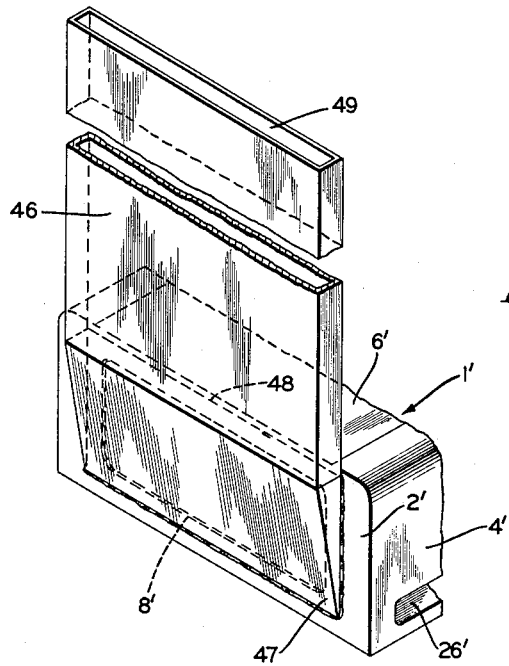
FIG. 8 is a perspective view of the ceiling return duct, showing the manner in which it is connected to the intake side of the air conditioner unit.

As best shown in FIG. 8, the duct 46 is of a width substantially the horizontal dimension of the back wall 2' of the air conditioner housing 1'. The lower end portion of the duct 46 is preferably tapered downward and toward the back wall of the housing 1', as indicated at 47, and is provided with the opening 48 communicating with the opening 8' in the back wall of the housing. The upper end of the duct 46 is open as indicated at 49.

With this arrangement, the warmer air from near the ceiling in the cab or other control quarters is drawn down through the duct 46 and into the intake side of the air conditioner housing 1', the air being filtered, cooled and discharged from the air conditioner in the manner above described.

The operator's seat, indicated generally at 30, is the same as that shown and described in detail with reference to FIGS. 1–4, and is mounted in the same manner upon the hinged top plate or cover of the air conditioner housing 1', and the same reference numerals are applied thereto as in FIGS. 1–4.

From the above it will be evident that a suitable air conditioner unit may be located within an overhead crane cab, or other relatively small or cramped control quarters without further crowding the same.

By so arranging the air conditioner unit so that it supports the operator's seat thus replacing the usual base or support for the seat, the air conditioner is located beneath the operator's seat in space which would ordinarily be wasted.

It should be understood that although the air conditioner apparatus is illustrated and described herein as adapted for cooling the air, suitable air conditioning apparatus for heating the air may be located in the housing upon which the operator's seat is mounted.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In a normally crowded industrial control quarters such as a crane cab, control pulpit and the like, having front, back and side walls and a floor and ceiling, an air conditioner unit comprising air filter means, an evaporator coil, and blower means enclosed in a housing located entirely within said control quarters upon the floor thereof adjacent the back wall thereof, a cover plate hingedly connected to the top of said housing, and an operator's seat detachably mounted upon said cover plate, said housing forming the sole support for said operator's seat, whereby said cover plate may be swung to open position to obtain access to the air conditioning apparatus within the housing without removing said seat therefrom.

2. In a normally crowded industrial control quarters such as a crane cab, control pulpit and the like, having front, back and side walls and a floor and ceiling, an air conditioner unit comprising air filter means, an evaporator coil, and blower means enclosed in a housing located entirely within said control quarters upon the floor thereof adjacent the back wall thereof, a cover plate hingedly connected to the top of said housing, and an operator's seat detachably and adjustably mounted upon said cover plate, said housing forming the sole support for said operator's seat, whereby said cover plate may be swung to open position to obtain access to the air conditioning apparatus within the housing without removing said seat therefrom.

3. In a normally crowded industrial control quarters such as a crane cab, control pulpit and the like, having front, back and side walls and a floor and ceiling, an air conditioner unit comprising air filter means, an evaporator coil, and blower means enclosed in a housing located entirely within said control quarters upon the floor thereof adjacent the back wall thereof, means for discharging conditioned air from the lower portion of said housing into the control quarters, and an operator's seat detachably mounted upon the top of the air conditioner housing, said housing forming the sole support for said operator's seat.

4. In a normally crowded industrial control quarters such as a crane cab, control pulpit and the like, having front, back and side walls and a floor and ceiling, an air conditioner unit comprising air filter means, an evaporator coil, and blower means enclosed in a housing located entirely within said control quarters upon the floor thereof adjacent the back wall thereof, means for discharging conditioned air from the lower portion of said housing into the control quarters, a cover plate hingedly connected to the top of said housing, and an operator's seat detachably mounted upon said cover plate, said housing forming the sole support for said operator's seat, whereby said cover plate may be swung to open position to obtain access to the air conditioning apparatus within the housing without removing said seat therefrom.

5. In a normally crowded industrial control quarters such as a crane cab, control pulpit and the like, having front, back and side walls and a floor and ceiling, an air conditioner unit comprising air filter means, an evaporator coil, and blower means enclosed in a housing located upon the floor of the control quarters adjacent the back wall thereof, air intake means in the back of said housing, air discharge means in the lower portion of said housing, an upright return duct located adjacent the back wall of said control quarters, the upper end of said duct being open and located adjacent to the ceiling of said control quarters, the lower end of the return duct communicating with the intake means of the air conditioner unit, and an operator's seat detachably mounted upon the top of the air conditioner housing, said housing forming the sole support for said operator's seat.

6. In a normally crowded industrial control quarters such as a crane cab, control pulpit and the like, having front, back and side walls and a floor and ceiling, an air conditioning unit comprising air filter means, an evaporator coil, and blower means enclosed in a housing located entirely within said control quarters upon the floor thereof adjacent the back wall thereof, a cover plate hingedly connected to the top of said housing, spaced parallel guide tracks on said cover plate, and an operator's seat adjustably and detachably mounted on said guide tracks, said housing forming the sole support for said operator's seat, whereby said cover plate may be swung to open position to obtain access to the air conditioning apparatus within the housing without removing said seat therefrom.

References Cited in the file of this patent
UNITED STATES PATENTS

| | | |
|---|---|---|
| 1,957,004 | Smith | May 1, 1934 |
| 2,480,552 | Colvez | Aug. 30, 1949 |
| 2,513,517 | Reilly | July 4, 1950 |
| 2,722,266 | Kerston | Nov. 1, 1955 |
| 2,782,834 | Vigo | Feb. 26, 1957 |
| 2,912,832 | Clark | Nov. 17, 1959 |
| 2,925,120 | Flint | Feb. 16, 1960 |